United States Patent [19]
Hagersten et al.

[11] Patent Number: 5,893,149
[45] Date of Patent: *Apr. 6, 1999

[54] FLUSHING OF CACHE MEMORY IN A COMPUTER SYSTEM

[75] Inventors: Erik E. Hagersten, Palo Alto, Calif.; Aleksandr Guzovskiy, Lowell, Mass.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 673,881

[22] Filed: Jul. 1, 1996

[51] Int. Cl.$^6$ .................................................. G06F 12/06
[52] U.S. Cl. ........................... 711/135; 711/113; 711/118; 711/119; 711/124; 711/141; 711/159
[58] Field of Search ..................................... 395/468, 448, 395/497.01, 473, 472, 490, 460, 800; 74/135, 141, 121, 170, 146, 145, 163, 133

[56] References Cited

U.S. PATENT DOCUMENTS

| | | | |
|---|---|---|---|
| 4,833,601 | 5/1989 | Barlow et al. | 395/468 |
| 5,025,365 | 6/1991 | Mathur et al. | 395/448 |
| 5,237,673 | 8/1993 | Orbits et al. | 395/497.01 |
| 5,249,283 | 9/1993 | Boland | 395/473 |
| 5,297,269 | 3/1994 | Donaldson et al. | 395/472 |
| 5,303,362 | 4/1994 | Butts, Jr. et al. | 395/448 |
| 5,313,609 | 5/1994 | Baylor et al. | 395/448 |
| 5,408,636 | 4/1995 | Santeler et al. | 395/490 |
| 5,611,070 | 3/1997 | Heidelberger et al. | 395/460 |
| 5,634,068 | 5/1997 | Nishtala et al. | 395/800 |

OTHER PUBLICATIONS

Saulsbury, A., et al, "An Argument for Simple Coma" Future Generations Computer Systems, vol. 11, No. 6, 1 Oct. 1995, pp. 553–566, XP000536147.

"Force Purge Table for Memory Directory in Directory Based Symmetric Multiprocessor Systems" IBM Technical Disclosure Bullentin, vol. 37, No. 8, 1 Aug. 1994, pp. 293/294 XP000456422.

Joe, T., et al. "Evaluating the Memory Overhead Required for Coma Architectures", Computer Architecture News, vol. 22, No. 2, 1 Apr. 1994, pp. 82–83, XP000450341.

*Primary Examiner*—Tod R. Swann
*Assistant Examiner*—Fred F. Tzeng
*Attorney, Agent, or Firm*—Conley, Rose & Tayon, PC; B. Noel Kivlin

[57] ABSTRACT

An efficient streamlined cache coherent protocol for replacing data is provided in a multiprocessor distributed-memory computer system. In one implementation, the computer system includes a plurality of subsystems, each subsystem includes at least one processor and an associated cache and directory. The subsystems are coupled to a global interconnect via global interfaces. In one embodiment, when data is replaced from a requesting subsystem, an asynchronous flush operation is initiated. In this implementation, the flush operation includes a pair of decoupled local flush instruction and corresponding global flush instruction. By decoupling the local flush instructions from the global flush instructions, once the requesting processor in the requesting subsystem is done issuing the local flush instruction, the requesting processor does not have to wait for a corresponding response from home location associated with the data being replaced. Instead, the requesting processor is freed up quickly since there is no need to wait for an acknowledgment from the home location (home subsystem) over the global interconnect. The home subsystem responds with an appropriate ACK message. The requesting subsystem reissues a read-to-own (RTO) transaction on its local interconnect thereby retrieving and invalidating any copy(s) of the data in the requesting subsystem. A Completion message is sent to the home subsystem together with the dirty data. Subsequently, a confirmation of the completion of the flush operation can be implemented using a "synchronization" mechanism to verify that all previously valid cache lines associated with a page have been successfully replaced with respect to their home location and the replaced cache lines are now marked "invalid" at the home subsystem.

21 Claims, 9 Drawing Sheets

| Request Agent Protocol | | | Home Agent Protocol | | | | | Slave A.P. | | | Req. Agent Protocol | | |
|---|---|---|---|---|---|---|---|---|---|---|---|---|---|
| Bus Trans | Req. Node MTAG | Request From Req. To Home | State in Dir D | State in Dir D' | Demand From: Home To Owner | Demand From: Home To Sharer | Reply To Req. | Owner To Req. | Sharer To Req. | | FT Reissues: Trans/ MTAG' | Compl. From Req. To Dir | |
| ROW | | | | | | | | | | | | | |
| #1 | WS_FLU | M,O,S | R_FLU | M,O | I | - | - | H_ACK | - | - | RTO_N_E/I | R_CMP_W |
| #2 | | | | S | I | - | - | H_NACK | - | - | RTO_N_S/I | R_CMP |
| #3 | | | | I | - | - | - | H_NOPE | - | - | - | R_CMP |
| #4 | | I | - | - | - | - | - | - | - | - | - | - |
| #5 | | N | R_FLU | M,O | I | - | - | H_ACK | - | - | RTO_N_E/- | R_CMP_W |
| #6 | | | | S | I | - | - | H_NACK | - | - | RTO_N_S/- | R_CMP |
| #7 | | | | I | - | - | - | H_NOPE | - | - | - | R_CMP |

FLUSHING OF CACHE MEMORY IN A COMPUTER SYSTEM

BACKGROUND OF THE INVENTION

Field of the Invention

This invention relates to caches in computer systems. In particular, this invention relates to a mechanism for maintaining data coherency when replacing data in the caches of these computer systems.

Incorporation by Reference

This patent application is related to the following copending, commonly assigned patent applications, the disclosures of which are incorporated herein by reference in their entirety:

Description of the Related Art

In a multi-level cache computer system having at least a lower-level cache and a higher-level cache, since the cache sizes are not infinitely large, eventually it becomes necessary to replace duplicated data in the computer system's cache memory in order to make room for caching new data. Generally, the smaller lower-level cache can replace data in its cache lines by generating write-backs, while replacement of the cached data pages in the larger higher-level cache is done under software control.

In one simplistic scheme, when a page in the higher-level cache memory needs to be replaced from a requesting subsystem of the computer system, the following sequence of steps are performed. For every cache line associated with the page, regardless of the status of the cache line, a "replace request" message is propagated, all the way to the data's home location. The home location references a home directory to determine the status of the cache line. If the requesting subsystem has "dirty" data, a request for the data is made from the home location to the requesting subsystem. The requesting subsystem then provides the data to the home location. Upon receipt of the data, the home location marks the appropriate entry of the home directory "Invalid" and a "replace_completed" message is sent back to the requesting subsystem.

Unfortunately, the above-described simplistic scheme generates an excessive amount of network traffic because an unnecessary number of network messages are exchanged between the requesting subsystem and the home location.

Thus there is a need for an efficient mechanism for replacing data in the cache memory of a computer system which maintains data coherency while reducing network traffic within the computer system.

SUMMARY OF THE INVENTION

The present invention provides an efficient streamlined cache coherent protocol for replacing data in a multiprocessor distributed-memory computer system. In one implementation, the computer system includes a plurality of subsystems, each subsystem includes at least one processor and an associated cache and directory. The subsystems are coupled to a global interconnect via global interfaces.

In one embodiment, when data is replaced from a requesting subsystem, an asynchronous flush operation is initiated. In this implementation, the flush operation includes a pair of decoupled local flush instruction and corresponding global flush instruction. By decoupling the local flush instructions from the global flush instructions, once the requesting processor in the requesting subsystem is done issuing the local flush instruction, the requesting processor does not have to wait for a corresponding response from home location associated with the data being replaced. Instead, the requesting processor is freed up quickly since there is no need to wait for an acknowledgment from the home location (home subsystem) over the global interconnect.

In this embodiment, the home subsystem responds with an appropriate ACK message. The requesting subsystem reissues a read-to-own (RTO) transaction on its local interconnect thereby retrieving and invalidating any copy(s) of the data in the requesting subsystem. A Completion message is sent to the home subsystem together with the dirty data.

Subsequently, a confirmation of the completion of the flush operation can be implemented using a "synchronization" mechanism provided by the computer system. Once such confirmation verifies that all previously valid cache lines associated with a page have been successfully replaced with respect to their home location, then the replaced cache lines can now be marked "invalid" at the home subsystem.

DESCRIPTION OF THE DRAWINGS

The objects, features and advantages of the system of the present invention will be apparent from the following description in which:

FIG. 3 is a protocol table depicting the operation of the embodiment illustrated by FIG. 2.

DESCRIPTION OF THE PREFERRED EMBODIMENT

In the following description, numerous details provide a thorough understanding of the invention. These details include functional blocks and an exemplary cache architecture to aid implementation of a cost-effective scheme for maintaining data coherency within a computer system. In addition, while the present invention is described with reference to a specific data coherent scheme for a distributed cache of a multiprocessor computer system, the invention is applicable to a wide range of caches and network architectures. In other instances, well-known circuits and structures are not described in detail so as not to obscure the invention unnecessarily.

Figure 1A:
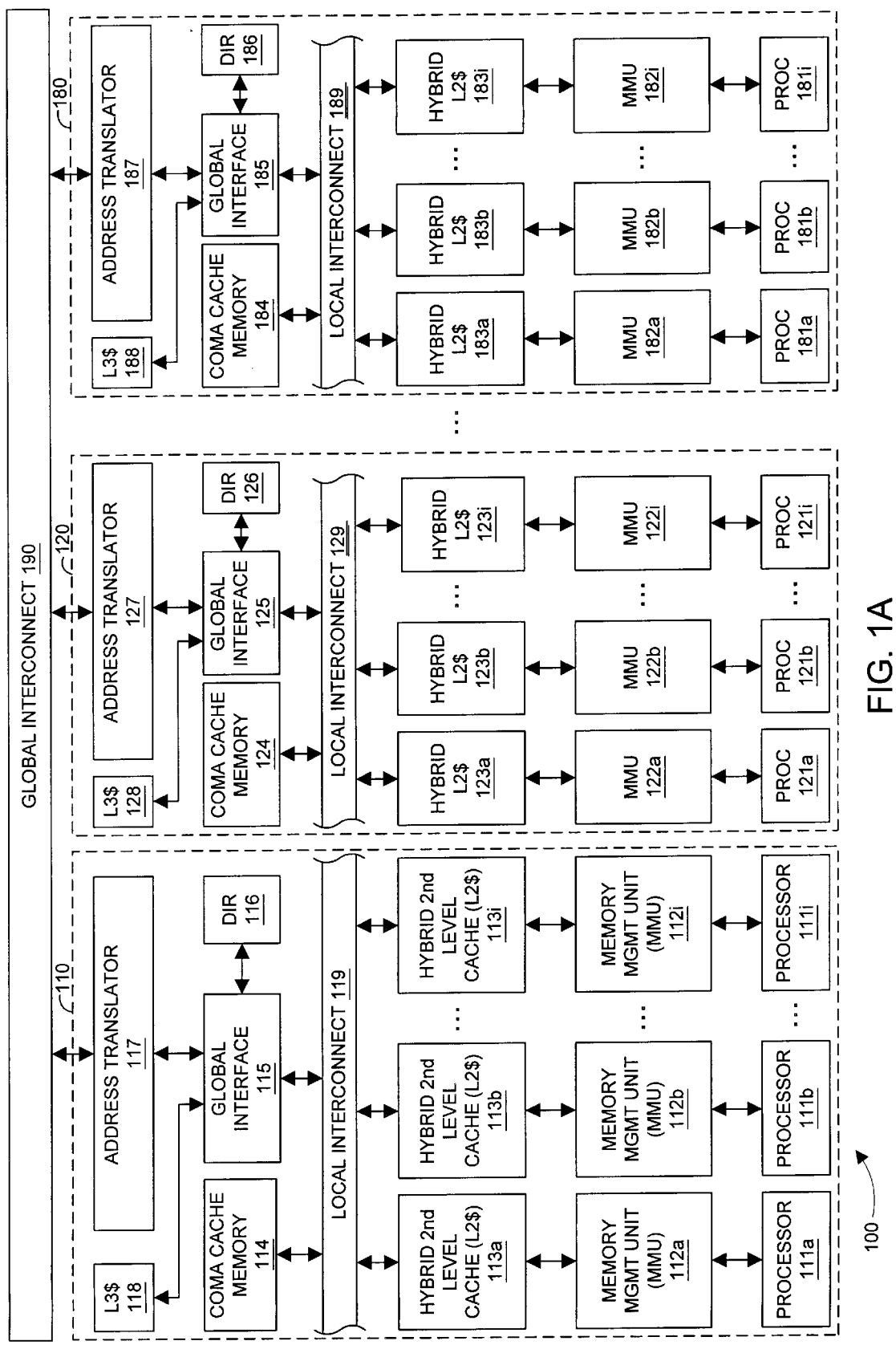
FIG. 1A is a block diagram showing a networked computering system 100 with a hybrid cache-only memory architecture/non-uniform memory architecture (COMA/NUMA).

The above-identified pending applications disclose a hybrid cache-only memory architecture/non-uniform memory architecture (COMA/NUMA) having a shared global memory address space and a coherent caching system for a networked computing system. FIG. 1A is a block diagram showing one such hybrid COMA/NUMA computer system 100 which provides a suitable exemplary hardware environment for the present invention.

System 100 includes a plurality of subsystems 110, 120, . . . 180, coupled to each other via a global interconnect 190. Each subsystem is assigned a unique network node address. Each subsystem includes one or more processors, a corresponding number of memory management units (MMUs) and hybrid second level caches (L2$s), a COMA cache memory assigned with portion of a global memory address space, an optional third-level cache (L3$), a global interface and a local interconnect. For example, subsystem 110 includes processors 111a, 111b . . . 111i, MMUs 112a, 112b, . . . 112i, L2$s 113a, 113b, . . . 113i, COMA cache memory 114, L3$ 118, global interface 115 and local interconnect 119. In order to support a directory-based cache coherency scheme, subsystems 110, 120, . . . 180 also include directories 116, 126, . . . 186 coupled to global interfaces 115, 125, . . . 185, respectively.

Data originating from, i.e., whose "home" location is, anyone of COMA cache memories 114, 124, . . . 184 may be duplicated in cache memory of system 100. For example, in COMA mode, system 100's cache memory includes both COMA cache memories 114, 124, . . . 184 and L2$s 113a . . . 113i, 123a . . . 123i, and 183a . . . 183i, and data whose "home" is in cache memory 114 of subsystem 110 may be duplicated in one or more of cache memories 124, . . . 184 and may also be duplicated in one or more of L2$s 113a . . . 113i, 123a . . . 123i, and 183a . . . 183i. Alternatively, in NUMA mode, system 100's cache memory includes L2$s 113a . . . 113i, 123a . . . 123i, and 183a . . . 183i, and data whose "home" is in cache memory 114 of subsystem 110 may be duplicated in one or more of L2$s 113a . . . 113i, 123a . . . 123i, and 183a . . . 183i.

Figure 1B:
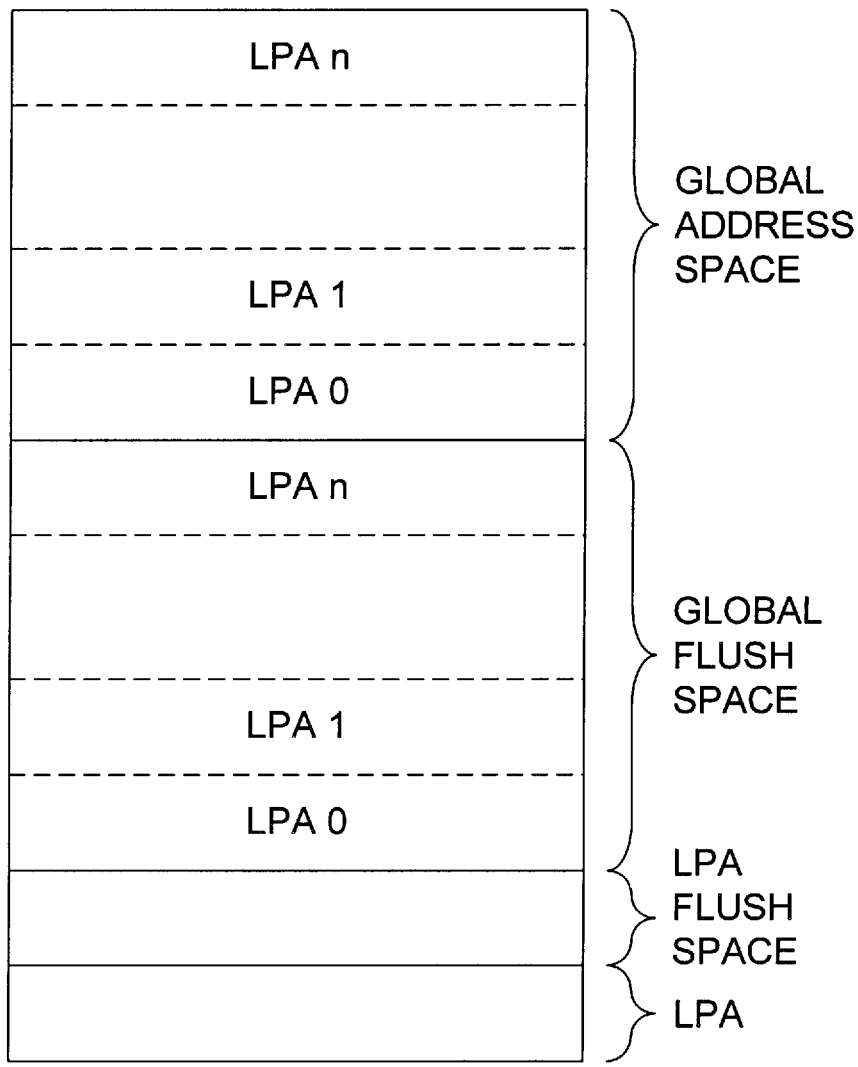
FIG. 1B is an exemplary memory map for a networked computering system of FIG. 1A.

In one embodiment of the present invention, as illustrated by the hybrid COMA/NUMA computer system 100 of FIG. 1A and the memory map of FIG. 1B, the "home" location of a page of data is in COMA cache memory 124 of subsystem 120, i.e., subsystem 120 is the home subsystem. The content of the home page can also exist in the cache memory space of one or more of requesting subsystems, for example, in the memory space of requesting subsystem 110. Hence, in COMA mode, memory space is allocated in COMA cache memory 114 in page increments, also known as shadow pages, and optionally in hybrid L2$s 113a, 113b, . . . 113i in cache line increments. Alternatively, in NUMA mode, memory space can be allocated in hybrid L2$ 113a, 113b, . . . 113i in cache line increments. Note that the allocation of memory units in system 100, pages and cache lines, are only exemplary and other memory units and sub-units are possible. See pending patent applications "A Hybrid NUMA Coma Caching System And Methods For Selecting Between The Caching Modes" by Hagersten et al., filed Dec. 22, 1995, Ser. No. 08/577,283. (Reference Number P1003) and "A Hybrid NUMA Coma Caching System And Methods For Selecting Between The Caching Modes" by Wood et al., filed Dec. 22, 1995, Ser. No. 08/575,787. (Reference Number P1004) which describe in detail the hybrid COMA/NUMA architecture and methods for selecting between the COMA/NUMA modes, respectively.

Home directory 126 is responsible for maintaining the states of existing copies of the home page throughout system 100. In addition, MTAGs associated with the home memory and any shadow page in subsystems 110, 180 track the status of the local copies in each requesting subsystem using one of the following four exemplary states.

An invalid ("I") state indicates that a particular subsystem does not have a (cached) copy of a data line of interest.

A shared ("S") state indicates that the subsystem, and possibly other nodes, have a shared (cached) copy of the data line of interest.

An owned ("O") state indicates that the subsystem, and possibly other nodes, have a (cached) copy of the data line of interest. The subsystem with the O copy is required to perform a write-back upon replacement.

A modified ("M") state indicates that the subsystem has the only (cached) copy of the data line of interest, i.e., the subsystem is the sole owner of the data line and there are no S copies in the other nodes.

Figure 2A:
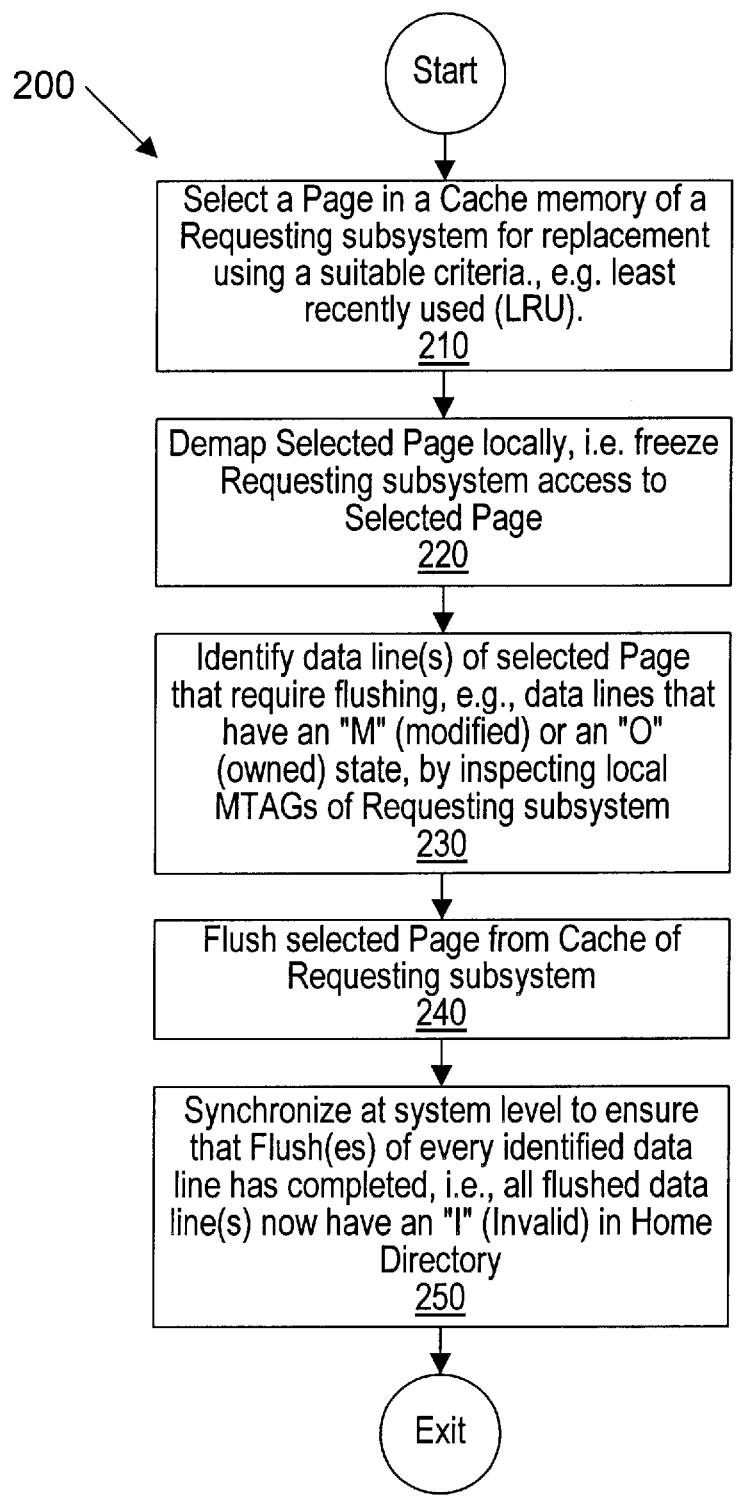
FIGS. 2A and 2B are flowcharts illustrating one embodiment of the invention.
Figure 2B:
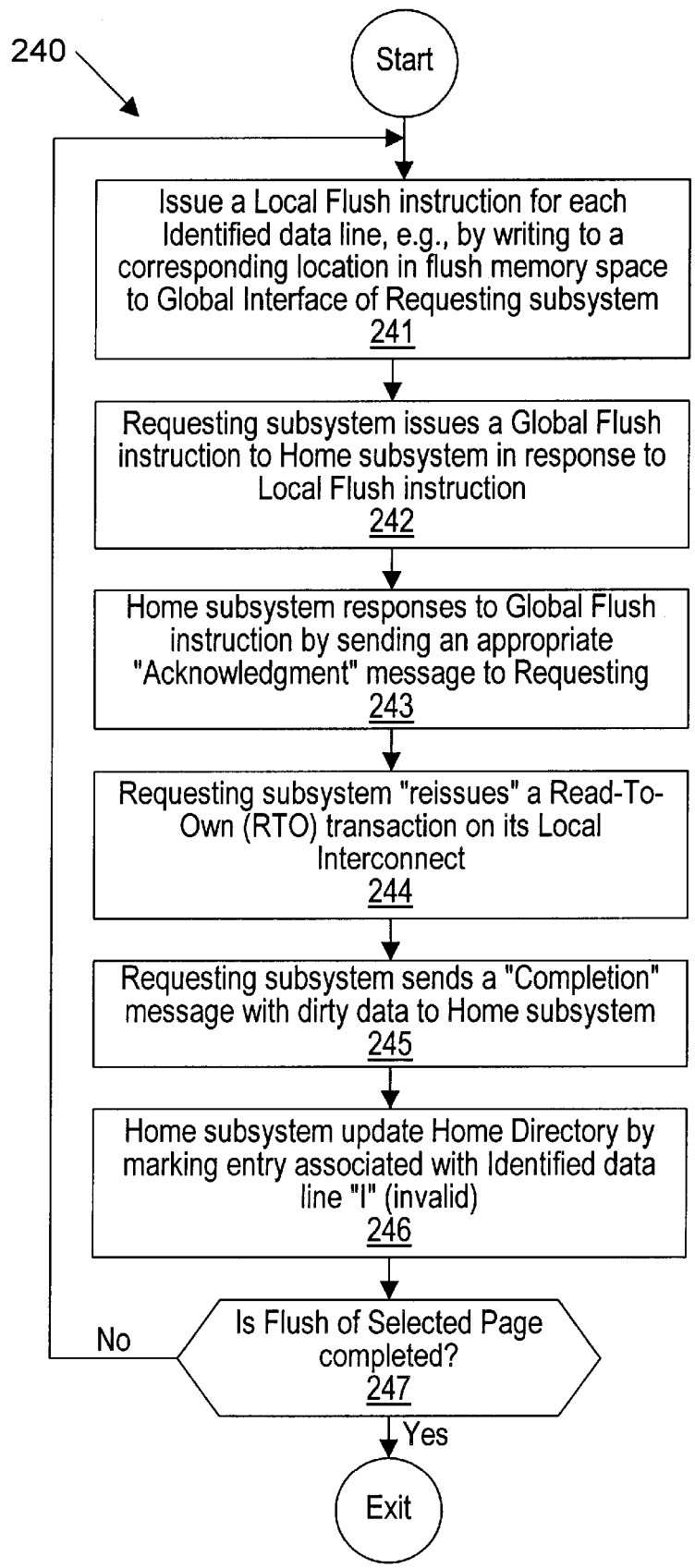

FIGS. 2A and 2B are flowcharts and FIG. 3 is a protocol table, illustrating how global data coherency between a shadow page in cache memory 114 and its corresponding home page in cache memory 124 is maintained, when requesting subsystem 110 needs to free the memory space currently occupied by the shadow page. Note that while the following example describes a flush operation on cache lines associated with a page cached in a higher-level cache, e.g., cache memory 114, the invention is applicable to other computer systems with non-COMA/NUMA architectures, such as a computer system with a COMA-only or any other type higher-level cache.

The following column definitions provide a guide to using the protocol table of FIG. 3.

Bus Trans specifies the transaction generated on the local interconnect. A Writestream to alternate LPA space have extra mnemonics added: prefetch shared (WS_PS), prefetch modified (WS_PM), fast write (WS_FW) and flush (WS_FLU).

Req. Node MTAG tells the MTAG state of the requested cache line, e.g. M (MODIFIED), O (OWNED), S (SHARED) or I (INVALID). Accesses to remote memory in NUMA mode have no valid MTAG and are denoted N (NUMA) in this column.

Request specifies what transactions are sent from the requester to the home agent.

State in Dir describes the D-state, which is the state in which the requesting node is (according to the home) when the home starts servicing the request, and the D-state, which is the requesting node's new state in the home. The symbol "-" indicates that no state change is necessary and the symbol "*" corresponds to all possible states. If the requester's state is not known, due to a limited directory representation, the D-state is here assumed to be I. State MODIFIED (M) is when the node is the owner and no sharers exists.

Demand specifies what demand transactions are sent from the home to the slaves. We distinguish between transactions to an owner and to a sharer. H_INV transactions are not sent to the requesting node, but all other transactions are sent if the home node is also a slave. Each demand carries the value of the number of demands sent out by the home agent.

Reply specifies what reply transactions are received by the requester to the home. We distinguish between transactions from an owner, a sharer and from the home. Each reply carries the value of the number of demands sent out by the home agent.

FT Reissue specifies what local interconnect transactions to send after all replies have been received. The extensions to the transactions are explained in Table 11-1. This column also defines the new MTAG state, which is sent with the transaction. The symbol "-" indicates that no state change is performed. Note that this is the only way of changing the MTAG state. This is why sometimes "dummy" RS_N/new_state are used to change the MTAG state. Note also that reissued transactions use the "normal" GA or LPA space even if the original transaction was to an alternative space. e.g., WS_PM.

Compl. describes the completion phase. It always involves a packet sent from the request agent back to the home agent. The completion may carry data.

Referring to both the table of FIG. 3 and the flowchart of FIG. 2A, one of several well-known algorithms can be used to select a suitable page for replacement (step 210). For example, the selection criteria may be a shadow page that has been least-recently used (LRU) or least frequently used. Note that home pages of subsystem 110 are normally preserved, i.e., they are treated preferentially with respect to shadow pages, since home pages are typically poor candidates for replacement.

Upon selection of a suitable shadow page for replacement, the selected page is demapped locally. In other words, local access to the selected page by processors 111a, 111b, ... 111i is frozen while the selected shadow page is in the process of being "flushed" (step 220). Flushing restores coherency between shadow pages and home pages within system 100 whenever a shadow page is discarded.

In this implementation, since the higher-level cache, e.g., cache 114, maintains MTAGs (memory tags) reflecting the status of the shadow cache lines locally, e.g., in directory 116, these local MTAG entries associated with each shadow cache line of the selected shadow page can be scanned by processor 111a. If the status of one or more of the shadow cache lines is valid, e.g., having an "O" (owned) or an "M" (modified) state, these shadow cache line(s) are identified for flushing (step 230). (See row #1 of FIG. 3). Alternatively, the entire selected page, i.e., every cache line associated with the selected page, can be flushed without consulting the local MTAGs, regardless of the respective MTAG state.

FIG. 2B details step 240 for flushing the selected shadow page from cache memory 114 of requesting subsystem 110. The asynchronous flush operation of each valid shadow cache line is carried out in a two distinct asynchronous phases. For each valid cache line in the selected shadow page, a local flush instruction (WS_FLU) which includes the address identifying the shadow cache line is sent to local global interface 115 of requesting subsystem 110 (step 241). In response to each local flush instruction, global interface 115 spawns a global flush instruction (R_FLU) to home subsystem 120 (step 242).

FIG. 1B shows an exemplary scheme for encoding flush instructions which use different ranges of addresses so that the flush instructions can be easily distinguished from other instructions by local interconnect 119. See co-pending application "A Multiprocessing System Configured to Perform Synchronization Operations" by Hagersten et al., filed concurrently herewith. (Reference Number P1551) for the exemplary encoding scheme.

In accordance with the invention, by decoupling the local flush instructions from the global flush instructions, once processor 111a is done issuing a local flush instruction, processor 111a does not have to wait for a corresponding response from home subsystem 120. Instead, processor 111a is freed up quickly since there is no need to wait for an acknowledgment from home subsystem 120 over global interconnect 190.

Referring again to FIG. 2B, upon receipt of the global flush instruction from requesting subsystem 110, home subsystem 120 sends an appropriate "acknowledgment" message back to requesting subsystem (step 243). As discussed above and detailed in FIG. 3, the type of acknowledgment message depends on the status of the shadow cache line as recorded in home directory 126.

As shown in row #1 of FIG. 3, if the status of the shadow cache line is "M" or "O", home subsystem 120 sends a "H_ACK" acknowledge message to requesting subsystem 110 indicating that the content of the corresponding cache line in the home page needs to be updated, i.e., the cache line is "dirty". Since requesting subsystem 110 has "dirty" data, home subsystem 120 has to "pull" the dirty data value from the replacing (previously requesting) subsystem 110. Sending the "H_ACK" causes requesting subsystem 110 to "reissue" a read-to-own (RTO) transaction on its local interconnect 119 (step 244). Because "dirty data can reside in either cache 114, L2$ 112a, or in both caches, the RTO transaction causes the retrieval of the dirty data from the appropriate cache within subsystem 110. The issuance of the RTO transaction on local interconnect 119 also has the effect of invalidating any shared copy within subsystem 110 and also updates the respective local MTAGs to the "I" state.

As shown in row #1 of FIG. 3, having retrieved the dirty data via local interconnect 119, requesting subsystem 110 can now send the dirty data appended to a "completion message", e.g., a "R_CMP_W" completion message (step 245). Home subsystem 120 is now able to update its home copy of the data and also its home directory 126 by marking the corresponding entry in home directory 126 "I" (invalid) (step 246). Hence, the above described flush operation permits the "M" and "O" copies of the home page to migrate back to COMA cache memory 124 of home system 120 gracefully and efficiently.

Referring now to row #2 of FIG. 3, if the status of the shadow cache line is "S" (shared), home subsystem 120 sends a "H_NACK" acknowledge message to requesting subsystem 110 indicating that the shadow cache line in the shadow page can be discarded and the corresponding MTAG associated with requesting directory 116 can be marked "I". Accordingly, requesting subsystem 110 reissues an RTO transaction on local interconnect 119 thereby invalidating any shared copy within subsystem 110 and also updates the respective local MTAGs of subsystem 110 to the "I" state. A "R_CMP" completion message, without any appended data, is sent to home subsystem 120. Home subsystem 120 updates the corresponding entry in home directory 126 by marking the shadow cache line as having an "I" (invalid) state.

Conversely, as depicted in row #3 of FIG. 3, if the status of the shadow cache line in home directory 126 is "I", home subsystem 120 sends a "H_NOPE" message to requesting subsystem 110. Subsequently, requesting subsystem 110 discards the shadow cache line and marks its corresponding local MTAG "I". A "R_CMP" completion message (without data) is sent to home subsystem 120.

As shown in row #4 of FIG. 3, if the local MTAG of requesting subsystem 110 shows the copy of data to be "I", no further action is taken by both requesting subsystem 110 and home subsystem 120.

As discussed above, it is also possible for data to be cached in L2$ 113a but not in cache 114, for example, if data is cached solely in NUMA mode. Hence, in addition to gracefully migrating COMA copies (using a local physical address) to home subsystem 120, system 100 must be capable of gracefully migrating NUMA copies (using a global address) back to home subsystem 120. This can be accomplished by generating the appropriate NUMA and/or COMA flush instructions using the global and local flush address space (encoding) shown in FIG. 11B.

Referring to rows #5–7 of FIG. 3, since the issuance of an RTO transaction on local interconnect 119 causes all copies of the data to be retrieved, the steps taken by requesting subsystem 110 is similar to the above-described steps for flushing data stored in cache 114. In this implementation, the major difference being the MTAGs only record the status of data stored in cache 114 but does not reflect the status of data stored in L2$ 113a. Hence, when data stored in L2$ 112a is replaced, with the exception of updating the local MTAG of requesting subsystem 110, both requesting subsystem 110 and home subsystem 120 take similar actions described above and depicted in row #1–3 of FIG. 3.

Referring to step 250 of FIG. 2A, a confirmation of the completion of the flush operation can be implemented using a "synchronization" mechanism. One such confirmation verifies that all previously valid cache lines associated with a page have been successfully replaced with respect to their home location and the replaced cache lines are now marked "invalid". An exemplary synchronization mechanism is described in co-pending application "A Multiprocessing System Configured to Perform Synchronization Operations" by Hagersten et al., filed concurrently herewith, (Reference Number P1551), and a description is also provided below.

Figure 4:
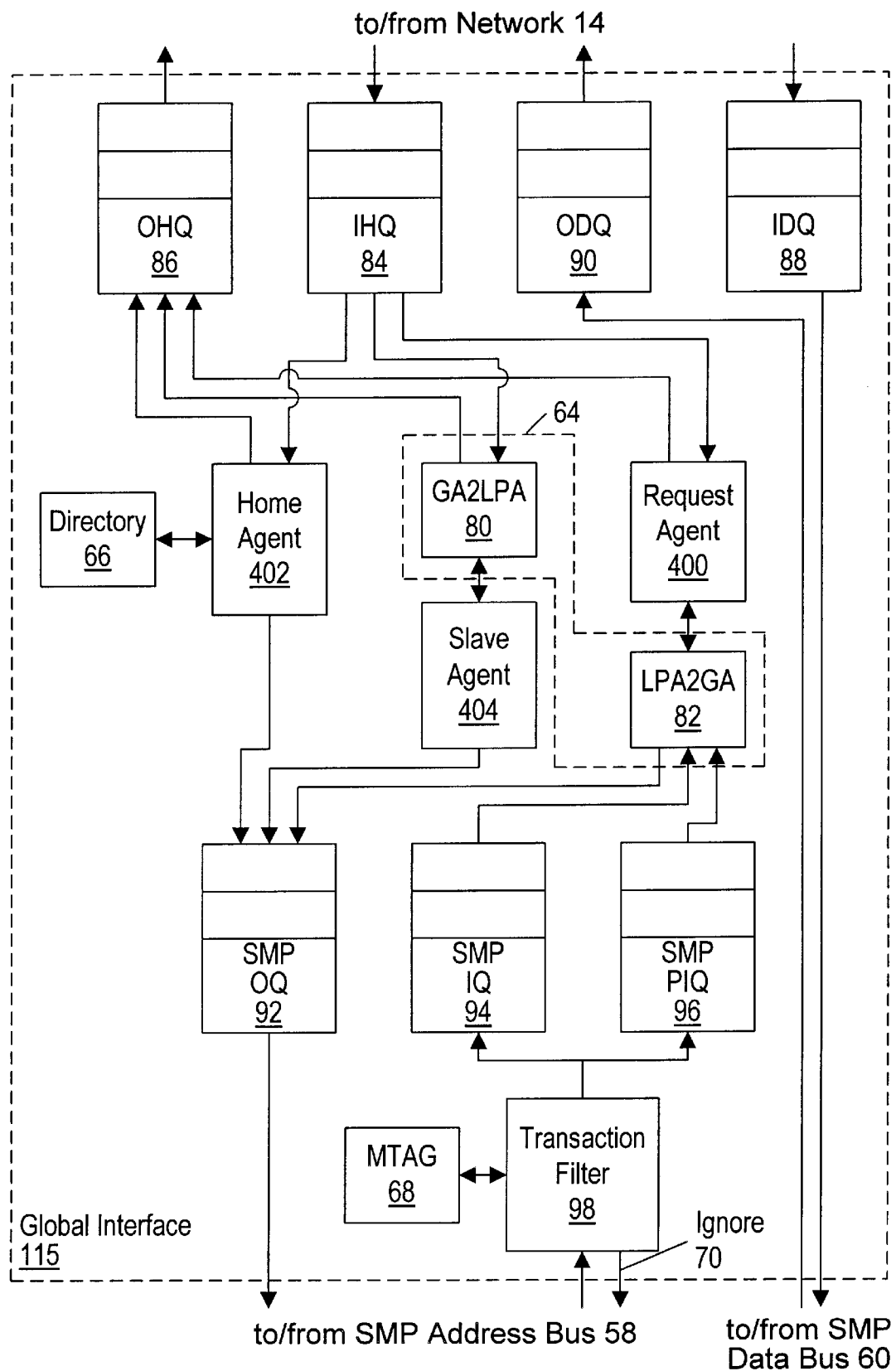
FIG. 4 is a block diagram depicting one embodiment of the global interface of Figure IA.
Figure 5:
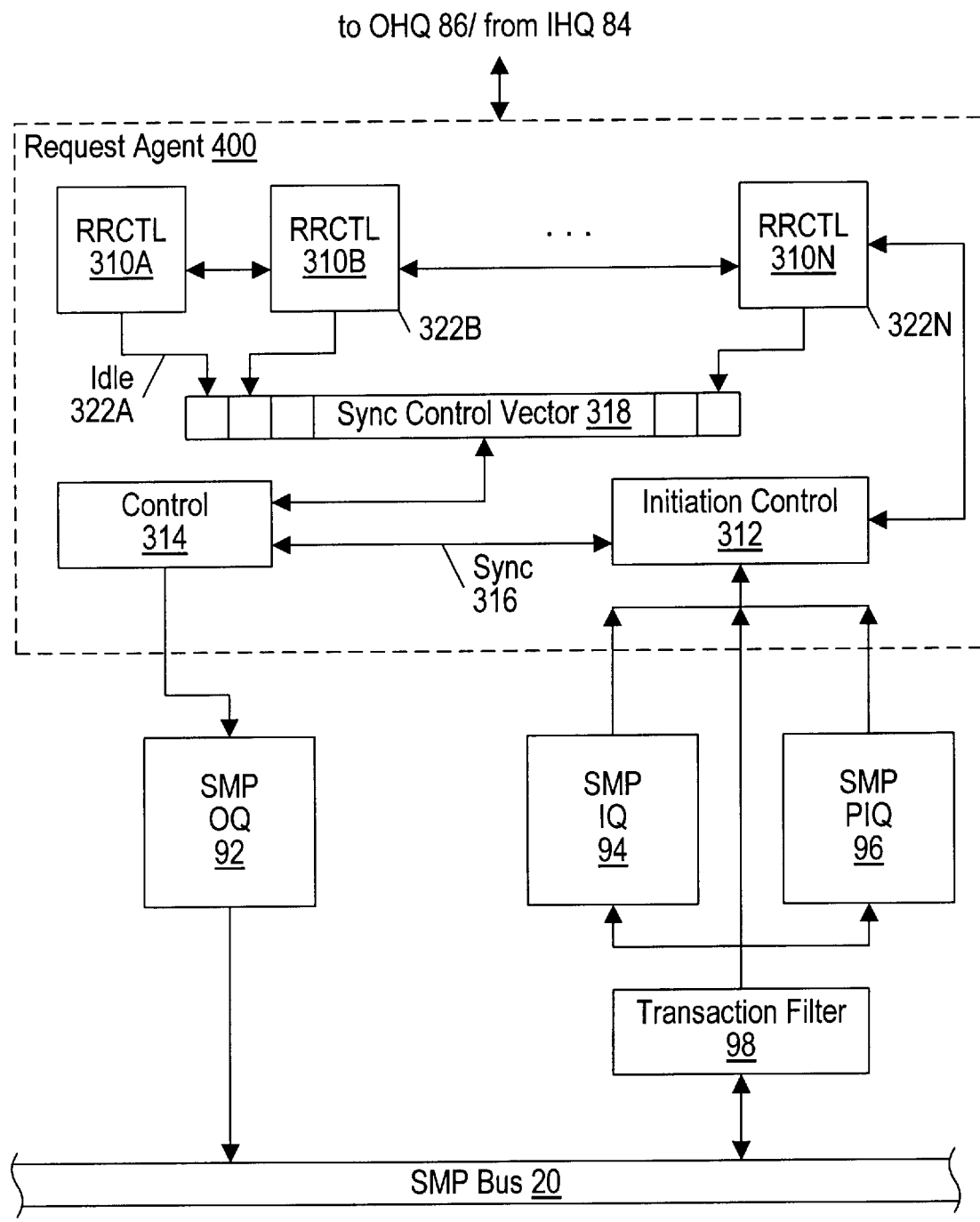
FIG. 5 is a block diagram of one embodiment of one portion of the global interface of FIG. 4.

Turning next to FIGS. 4 and 5, a block diagram of one embodiment of global interface 115 and a detailed block diagram of request agent 400 are shown, respectively. Additionally, SMP in queue 94, SMP PIQ 96, SMP out queue 92, and transaction filter 98 are shown. Transaction filter 98 is coupled to SMP bus 20, SMP in queue 94, SMP PIQ 96, and request agent 400. SMP out queue 92, SMP in queue 94, and SMP PIQ 96 are coupled to request agent 400 as well.

Each transaction presented upon SMP bus 20 for which ignore signal 70 is asserted is stored by global interface 115 for later reissue. As mentioned above, ignore signal 70 may be asserted if the access rights for the affected coherency unit do not allow the transaction to complete locally. Additionally, ignore signal 70 may be asserted if a prior transaction from the same subnode 50 is pending within global interface 115. Still further, ignore signal 70 may be asserted for other reasons (such as full in queues, etc.).

Request agent 400 comprises multiple independent control units 310A–310N. A control unit 310A–310N may initiate coherency activity (e.g. perform a coherency request) for a particular transaction from SMP in queue 94 or SMP PIQ 96, and may determine when the coherency activity completes via receiving replies. An initiation control unit 312 selects transactions from SMP in queue 94 and SMP PIQ 96 for service by a control unit 310A–310N. Any selection criteria may be employed as long as neither SMP in queue 94 nor SMP PIQ 96 are unconditionally prioritized higher than the other and as long as at least one control unit 310A–310N is not allocated to performing I/O operations.

In addition to selecting transactions for service by control units 310, initiation control unit 312 informs a second control unit 314 that a synchronization operation has been selected for initiation. A sync signal upon a sync line 316 coupled between initiation control unit 312 and control unit 314 is asserted when a synchronization operation is selected from either SMP in queue 94 or SMP PIQ 96. Control unit 314 manages a synchronization vector control register 318, and reissues the synchronization operation to SMP out queue 92 upon completion of the synchronization operation.

Upon receipt of an asserted sync signal upon sync line 316, control unit 314 causes control register 318 to record which control units 310 are currently performing coherency activities (i.e. those control units 310 which are not idle). In one embodiment, control register 318 includes multiple bits. Each bit corresponds to one of control units 310. If the bit is set, the corresponding control unit 310A–310N is performing coherency activity which was initiated prior to control unit 314 initiating a synchronization operation. If the bit is clear, the corresponding control unit 310A–310N is either idle or performing coherency activity which was initiated subsequent to control unit 314 initiating a synchronization operation. Each control unit 310 provides an idle line (e.g. idle line 322A from control unit 310A) to control register 318. When the idle signal upon an idle line 322 is asserted, the bit corresponding to the idle control unit 310 within control register 318 is cleared.

Control unit 314 monitors the state of control register 318. When each of the bits have been reset, each of control units 310 have been idle at least once. Therefore, coherency activity which was outstanding upon initiation of the synchronization operation has completed. Particularly, the transactions corresponding to the coherency activity have been globally performed. Therefore, the synchronization operation is complete. Control unit 314 reissues the synchronization operation to SMP out queue 92, and subsequently the reissue transaction completes within the SMP node. More particularly, the synchronization transaction is cleared from the initiating processor. The initiating processor may therefore determine when the synchronization operation has completed (by inserting a processor level synchronization subsequent to the synchronization operation, for example). Exemplary code sequences employing the synchronization operation are shown below.

In one embodiment, the synchronization operation is placed into SMP in queue 94 upon performance of the synchronization operation upon SMP bus 20 (similar to other transactions). Additionally, ignore signal 70 is asserted for the synchronization operation upon SMP bus 20.

It is noted that request agent 400 is configured to accept only one synchronization operation at a time in the present embodiment. Furthermore, two types of synchronization operations are defined: a coherent synchronization and I/O synchronization. Coherent synchronizations synchronize transactions placed in SMP in queue 94. Alternatively, I/O synchronizations synchronize I/O transactions (i.e. transactions placed in SMP PIQ 96).

Additionally, control units 310 may further employ a freeze state for use when errors are detected. If an error is detected for a transaction being serviced by a control unit 310, the control unit transitions to a freeze state and remains therein until released by a software update to a control register. In this manner, information regarding the transaction for which the error is detected (stored by the state machine) may be accessed to aid in determining the error. For purposes of allowing synchronization operations to complete, entering the freeze state is equivalent to entering the idle state.

Figure 6:
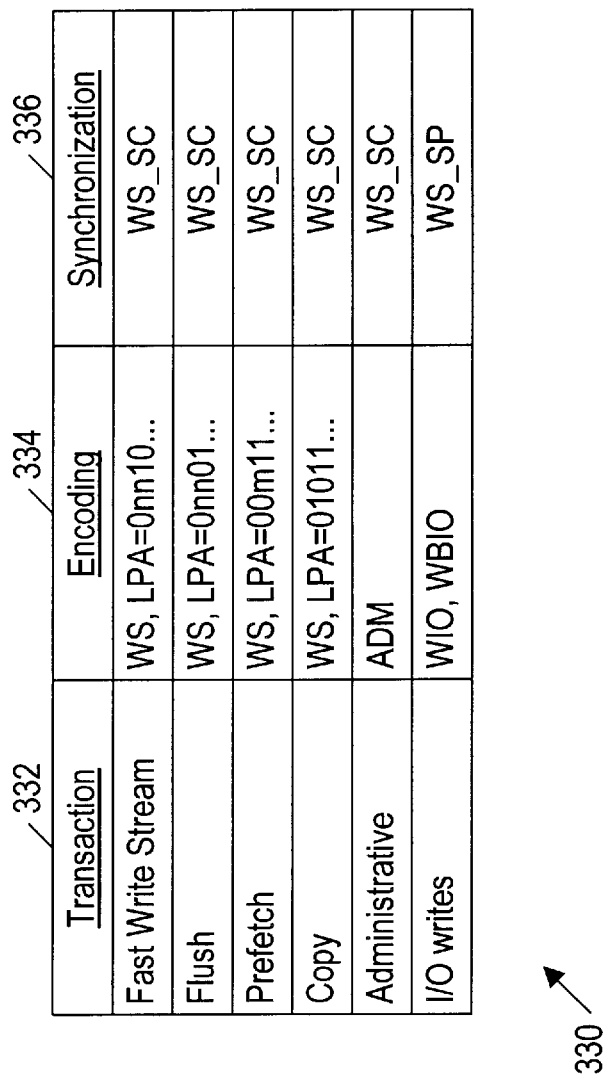
FIG. 6 is a table depicting synchronous operations employed by one embodiment of the computer system of FIG. 1A.

Turning next to FIG. 6, a table 330 is shown listing exemplary asynchronous operations according to one embodiment of computer system 100. A column 332 lists the asynchronous transaction. A column 334 lists the encoding of the transaction upon SMP bus 20. Finally, a column 336 lists the synchronization operation which is used to synchronize the particular asynchronous operations.

The fast write stream asynchronous operation is employed to enhance the performance characteristics of writes to remote nodes. When a fast write stream operation is performed, system interface 115 allows the initiating processor to transfer the data thereto prior to performing coherency activities which may be required to obtain write permission to the affected coherency unit. In this manner, the processor resources consumed by the fast write stream operation may be freed more rapidly than otherwise achievable. As shown in column 334, the fast write stream operation is coded as a write stream having the five most significant bits of the address coded as shown. The "nn" identifies the home node of the address. The coherent synchronization operation ("WS_SC") is used to synchronize the fast write stream operation.

A second asynchronous operation employed in the exemplary embodiment is the flush operation. When a flush operation is detected by system interface 115, the affected coherency unit (if stored in the SMP node) is flushed. In other words, the coherency unit is stored back to the home node and the MTAG for the coherency unit is set to invalid. In the exemplary embodiment, the flush operation is coded as a write stream operation having the five most significant bits of the address coded as shown in column 334. The flush command uses a write stream encoding, although the data corresponding to the write stream is discarded. Similar to the fast write stream, system interface 115 allows the data to be transferred prior to global performance of the flush operation. The flush operation is synchronized using WS_SC.

The synchronization operations in the exemplary embodiment are coded as write stream operations as well, although any encoding which conveys the synchronization command upon SMP bus 20 may be used. In particular for the exemplary embodiment, the WS_SC operation is coded as a write stream operation for which the seven most significant address bits are coded as 0111100 (in binary). The WS_SP operation is coded as a write stream operation for which the seven most significant address bits are coded as 0111101 (in binary). An alternative embodiment may employ a specially coded I/O read operation to perform synchronization. When the I/O read operation is detected, previously received transactions are completed prior to returning data for the I/O read operation.

Figure 7:
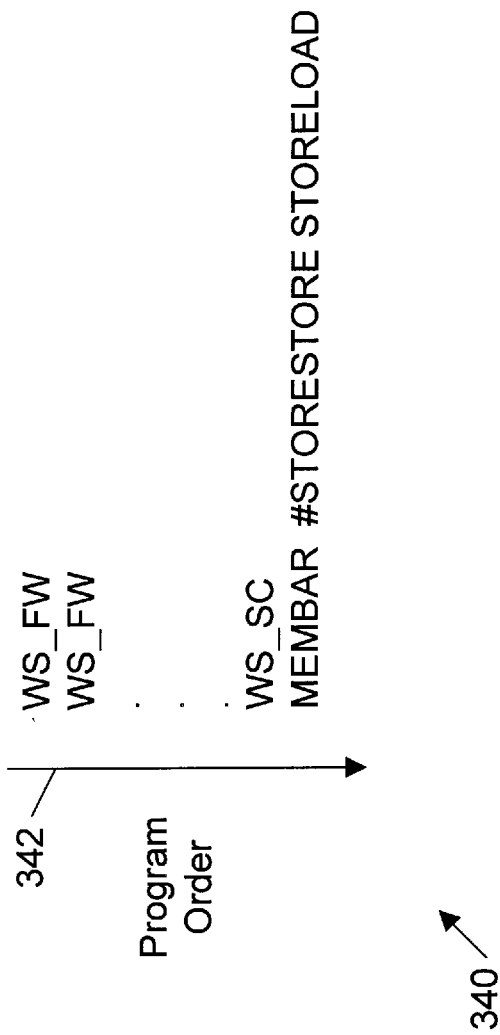
FIG. 7 is an exemplary code sequence using one of the synchronization operations shown in FIG. 6.

Turning now to FIG. 7, an exemplary code sequence 340 is shown depicting use of synchronization operations. The example includes instructions from the SPARC microprocessor architecture. The order of operations in the program (the "program order") is indicated by arrow 342. In the example, several fast write stream operations are performed (the "WS_FW" operations shown in FIG. 7). Upon completion of a series of fast write stream operations, the code sequence includes a WS_SC operation to synchronize the completion of the operations. Additionally, a MEMBAR instruction is included to guarantee completion of the WS_SC operation prior to initiation of any memory operations subsequent to the MEMBAR instruction.

Generally, the WS_SC operation is an example of a system level synchronization operation. The WS_SC operation causes a synchronization to occur in the system interface 115 of the SMP node 12A–12D within which the WS_SC operation is executed. In this manner, the node is synchronized. However, synchronizing the processor itself is performed using a processor level synchronization operation. The processor level synchronization operation does not synchronize the node, but does synchronize the processor 111a within which it is executed. By pairing a system level synchronization in the manner of FIG. 7, a complete synchronization of each level of the computer system may be achieved.

Various optimizations of the above described cache coherent mechanism are possible. For example, when flushing a shadow page, instead of flushing valid cache lines individually, the entire page may be flushed. Performance tradeoffs are also possible. For example, instead of flushing cache lines with a "M" or "O" state when a page is replaced, the entire page, i.e., every cache line may be flushed, simplifying the procedure at the expense of the network traffic.

Other modifications and additions are possible without departing from the spirit of the invention. For example, instead of blocking all read and write requests whenever a request is outstanding, read-to-share requests are blocked only if there is a read-to-own or a write-back request outstanding. In addition, each subsystem may be equipped with additional circuitry to perform "local data forwarding" so that processors within a subsystem can provide data to each other without accessing the host directory of another subsystem. Hence, the scope of the invention should be determined by the following claims.

What is claimed is:

1. A method for replacing data while maintaining coherency of said data within a computer system having at least a first subsystem and a second subsystem coupled to each other via an interconnect, wherein said first subsystem and said second subsystem each include a local interconnect, a global interface, at least one processor, and at least one cache, and wherein said first subsystem is a home of said data, the method comprising:

selecting a page of data in said at least one cache of said second subsystem, wherein said page of data contains a plurality of data lines;

freezing all accesses of said second subsystem to said page of data;

identifying at least one data line of said plurality of data lines of said page of data, wherein said at least one data line contains data that requires flushing;

flushing said at least one data line of said plurality of data lines of said page of data, wherein said flushing includes issuing of a local flush instruction and a global flush instruction, said local flush instruction is issued by said at least one processor of said second subsystem to said global interface of said second subsystem, and said global flush instruction is issued by said at least one processor of said second subsystem to said first subsystem in response to said local flush instruction, and wherein said global flush instruction is performed asynchronously from said local flush instruction; and maintaining a coherency between said at least one data line of said plurality of data lines of said page of data flushed in said second subsystem and data in said first subsystem.

2. The method as recited in claim 1 wherein said selecting a page of data in said at least one cache of said second subsystem includes a criterion suitable to select said page of data that is suitable for replacement.

3. The method as recited in claim 2 wherein said criterion includes a least recently used criterion.

4. The method as recited in claim 1 wherein said freezing all accesses of said second subsystem to said page of data includes denying local accesses initiated by said at least one processor of said second subsystem.

5. The method as recited in claim 1 wherein said identifying at least one data line of said plurality of data lines of said page of data includes determining if said data line is in valid status.

6. The method as recited in claim 5 wherein said valid status of said data line includes either an owned state or a modified state, wherein said owned said indicates that said second subsystem has a cached copy of said data line and said modified state indicates that said second subsystem is the sole owner of said data line.

7. The method as recited in claim 6 wherein a subsystem that has said owned state of said data line is configured to perform a write-back upon replacement of said data line.

8. The method as recited in claim 1 wherein said flushing said at least one data line of said plurality of data lines of said page of data is executed when said data line is in said valid status, and said flushing is not executed if said data line is in an invalid status, wherein said invalid status indicates that said second subsystem can discard said data line.

9. The method as recited in claim 8 wherein said invalid status of said data line includes either an invalid state or a shared state, wherein said invalid state indicates that said second subsystem has no cached copy of said data line, and said shared state indicates that said second subsystem has a shared cached copy of said data line.

10. The method as recited in claim 1 wherein said maintaining said coherency comprises:
    sending a synchronization request from said second subsystem to said first subsystem;
    verifying that said data is now coherent between said first subsystem and said second subsystem; and
    sending an acknowledgment from said first subsystem to said second subsystem in response to said synchronization request, said acknowledgment indicating that said data is now coherent between said second and said first subsystem.

11. The method as recited in claim 10 wherein said acknowledgement by said first system to said second subsystem comprises either a first message, a second message, or a third message; wherein said first message is indicative of either said owned state or said modified state of said data line, said second message is indicative of said shared cached copy of said data line, and said third message is indicative of said no cached copy of said data line.

12. A method for flushing a selected page of data in a cache memory in a requesting subsystem while maintaining coherency of said data with a home subsystem within a computer system, wherein said selected page of data comprises a plurality of data lines, said requesting subsystem is coupled to said home subsystem via an interconnect, said requesting subsystem and said home subsystem each include a local interconnect, a global interface, at least one processor, and at least one said cache memory, wherein said computer system comprises at least said home subsystem and requesting subsystem, the method comprising:
    issuing a local flush instruction for each data line of said plurality of data lines within said selected page in said cache memory of said requesting subsystem by said at least one processor, wherein said data line is identified for replacement;
    issuing a global flush instruction by said at least one processor of said requesting subsystem to said home subsystem in response to said local flush instruction, wherein said issuing of said global flush instruction is performed asynchronously from said local flush instruction;
    sending an acknowledgment message by said home subsystem to said requesting subsystem in response to said global flush instruction issued by said requesting subsystem, wherein said acknowledgement message is indicative of a status of said data line;
    issuing of a read-to-own transaction by said requesting subsystem on said local interconnect of said requesting subsystem in response to said acknowledgment message indicative of at least one of said status of said data line;
    sending a completion message by said requesting subsystem to said home subsystem; and
    updating a directory in said home subsystem by said home subsystem in response to said completion message, wherein said directory comprises at least one entry indicative of said status of said data line.

13. The method as recited in claim 12 wherein said status of said data line comprises one of either an owned state, a modified state, a shared state, or an invalid state of said data line, wherein said owned state indicates at least said home subsystem has a cached copy of said data line, said modified state indicates said home subsystem is the sole owner of said data line, said shared state indicates at least said home subsystem has a shared copy of said data line, and said invalid state indicates said home subsystem has no copy of said data line.

14. The method as recited in claim 13 wherein said sending said acknowledgment message by said home subsystem comprises either a first message, a second message, or a third message; wherein said first message is indicative of either said owned state or said modified state of said data line, said second message is indicative of said shared state of said data line, and said third message is indicative of said invalid state of said data line.

15. The method as recited in claim 14 wherein either said second message or said third message sent by said home subsystem to said requesting subsystem further indicates that said requesting subsystem can discard said data line.

16. The method as recited in claim 12 wherein said flushing is further comprises synchronization of all identified data lines in said page of data of said requesting subsystem wherein said synchronization results in every line of said all identified data lines having said invalid state in said home subsystem.

17. A system for replacing a selected page of data in a cache memory in a requesting subsystem while maintaining coherency of said data with a home subsystem within a computer system, wherein said selected page of data comprises a plurality of data lines, said requesting subsystem is coupled to said home subsystem via an interconnect, said requesting subsystem and home subsystem each includes a local interconnect, a global interface, at least one processor, and at least one said cache memory, wherein said computer system comprises at least said home subsystem and requesting subsystem, the mechanism comprises:
    a detector configured to detect a need to replace said data in said cache memory of said requesting subsystem;
    an identifier configured to identify said selected page of data in said cache memory and to identify at least one data line of said plurality of data lines in said selected page of data in said requesting subsystem;
    an asynchronous flusher configured to flush all identified data lines in said selected page in said cache memory of said requesting subsystem, wherein said asynchronous flusher is further configured to:
        issue a local flush instruction for each identified data line of said plurality of data lines,
        issue a global flush instruction to said home subsystem in response to said local flush instruction, wherein said global flush instruction is asynchronous to said local flush instruction,
        receive an acknowledgment message sent by said home subsystem in response to said global flush instruction, wherein said acknowledgement message is indicative of a status of said identified data line, issue a read-to-own transaction on said local interconnect of said requesting subsystem in response to said acknowledgment message, and send a completion message to said home subsystem.

18. The system as recited in claim 17 said home subsystem updates a directory in said home subsystem in response to said completion message, wherein said directory comprises at least one entry indicative of said status of said identified data line.

19. The system as recited in claim 17 wherein said status of said identified data line comprises one of either an owned state, a modified state, a shared state, or an invalid state of said identified data line, wherein said owned state indicates at least said home subsystem has a cached copy of said identified data line, said modified state indicates said home subsystem is the sole owner of said identified data line, said shared state indicates at least said home subsystem has a shared copy of said identified data line, and said invalid state indicates said home subsystem has no copy of said identified data line.

20. The system as recited in claim 17 wherein said receive said acknowledgment message sent by said home subsystem message comprises either a first message, a second message, or a third message; wherein said first message is indicative of either said owned state or said modified state of said selected data line, said second message is indicative of said shared state of said selected data line, and said third message is indicative of said invalid state of said selected data line, and wherein either said second message or said third message further indicates that said requesting subsystem can discard said identified data line.

21. The system as recited in claim 17 further configured to synchronize said flush of said selected page of data of said cache memory of said requesting subsystem until every said identified data line of said selected page of data has said invalid state in said home subsystem.

* * * * *